United States Patent
Hwang et al.

(10) Patent No.: US 12,009,731 B2
(45) Date of Patent: Jun. 11, 2024

(54) ROTARY DEVICE WITH A FAN MOUNTED OUTSIDE A HOUSING TO INTRODUCE EXTERNAL AIR INTO THE HOUSING

(71) Applicant: HANWHA POWERSYSTEMS CO., LTD., Changwon-si (KR)

(72) Inventors: Jin Seok Hwang, Changwon-si (KR); Hong Gi Park, Changwon-si (KR)

(73) Assignee: HANWHA POWERSYSTEMS CO., LTD, Changwon-si (KR)

( * ) Notice: Subject to any disclaimer, the term of this patent is extended or adjusted under 35 U.S.C. 154(b) by 360 days.

(21) Appl. No.: 16/894,194

(22) Filed: Jun. 5, 2020

(65) Prior Publication Data

US 2020/0389069 A1 Dec. 10, 2020

(30) Foreign Application Priority Data

Jun. 5, 2019 (KR) ........................ 10-2019-0066787

(51) Int. Cl.
| | |
|---|---|
| *H02K 9/06* | (2006.01) |
| *H02K 5/167* | (2006.01) |
| *H02K 5/18* | (2006.01) |
| *H02K 5/20* | (2006.01) |
| *H02K 7/08* | (2006.01) |
| *H02K 9/18* | (2006.01) |

(52) U.S. Cl.
CPC ............. *H02K 9/06* (2013.01); *H02K 5/1675* (2013.01); *H02K 5/18* (2013.01); *H02K 5/207* (2021.01); *H02K 7/085* (2013.01); *H02K 9/18* (2013.01)

(58) Field of Classification Search
CPC ............ H02K 5/20; H02K 5/22; H02K 5/225; H02K 5/1675; H02K 5/18; H02K 9/04; H02K 9/06; H02K 9/02; H02K 9/18; H02K 7/085

USPC ............... 310/58, 59, 60 R, 61, 62, 63, 60 A
See application file for complete search history.

(56) References Cited

U.S. PATENT DOCUMENTS

| | | | | |
|---|---|---|---|---|
| 2,114,907 A | * | 4/1938 | Oesterlein | H02K 9/14 |
| | | | | 415/232 |
| 3,383,529 A | * | 5/1968 | Baumann | H02K 9/06 |
| | | | | 310/52 |

(Continued)

FOREIGN PATENT DOCUMENTS

| | | |
|---|---|---|
| CN | 2480589 Y | 3/2002 |
| KR | 10-0675821 B1 | 1/2007 |

(Continued)

OTHER PUBLICATIONS

Communication issued on Apr. 4, 2024 by the Korean Intellectual Property Office for Korean Patent Application No. 10-2019-0066787.

*Primary Examiner* — Maged M Almawri
(74) *Attorney, Agent, or Firm* — Sughrue Mion, PLLC

(57) ABSTRACT

A rotary device includes a housing; an impeller provided in the housing; a rotor disposed at a rear of the impeller, and configured to rotate; a stator disposed to surround the rotor; a bearing at the rear of the impeller, and configured to relieve friction caused by rotation of the rotor while supporting the rotor when the rotor is rotated; and a fan mounted to an outside of the housing, and configured to introduce external air into an inside of the housing and, after the external air is heated while travelling on a cooling flow path, release the external air to the outside of the housing.

18 Claims, 10 Drawing Sheets

(56) References Cited

U.S. PATENT DOCUMENTS

| | | | | |
|---|---|---|---|---|
| 4,406,959 A * | 9/1983 | Harano | H02K 9/06 | 310/58 |
| 5,698,916 A * | 12/1997 | Eguchi | H02K 5/128 | 310/58 |
| 5,747,900 A * | 5/1998 | Nakamura | H02K 9/16 | 310/58 |
| 5,757,095 A * | 5/1998 | Ohmi | H02K 13/08 | 310/58 |
| 6,078,115 A * | 6/2000 | Uchida | H02K 9/193 | 310/58 |
| 6,570,276 B1 * | 5/2003 | Morel | H02K 9/06 | 310/52 |
| 6,700,235 B1 * | 3/2004 | McAfee | H02K 9/06 | 310/58 |
| 6,891,290 B2 * | 5/2005 | Nagayama | H02K 5/20 | 310/58 |
| 8,519,580 B2 * | 8/2013 | Brandl | H02K 9/16 | 310/58 |
| 8,536,743 B2 * | 9/2013 | Kasuya | B60L 3/0061 | 310/58 |
| 8,536,744 B2 * | 9/2013 | Nagayama | H02K 9/08 | 310/58 |
| 8,786,148 B2 * | 7/2014 | Yagi | H02K 9/06 | 310/90 |
| 9,680,340 B2 * | 6/2017 | Noack | H02K 9/06 | |
| 9,991,759 B2 * | 6/2018 | White | H02K 5/18 | |
| 2001/0033112 A1 | 10/2001 | Stahl et al. | | |
| 2004/0150270 A1 * | 8/2004 | Nagayama | H02K 1/32 | 310/59 |
| 2006/0055256 A1 * | 3/2006 | Kreitzer | H02K 9/18 | 310/59 |
| 2006/0226717 A1 * | 10/2006 | Nagayama | H02K 9/06 | 310/58 |
| 2007/0024129 A1 * | 2/2007 | Pfannschmidt | H02K 1/20 | 310/59 |
| 2007/0024133 A1 * | 2/2007 | Kato | H02K 11/33 | 310/58 |
| 2007/0273220 A1 * | 11/2007 | Koyama | H02K 5/203 | 310/58 |
| 2009/0179510 A1 * | 7/2009 | Yoshida | H02K 11/048 | 310/68 D |
| 2011/0109176 A1 * | 5/2011 | Yoshimura | H02K 9/227 | 310/64 |
| 2012/0062057 A1 * | 3/2012 | Nagayama | H02K 9/18 | 310/59 |
| 2012/0212086 A1 * | 8/2012 | Nagayama | G01P 3/487 | 310/59 |
| 2013/0009497 A1 * | 1/2013 | Chang | H02K 9/14 | 310/64 |
| 2013/0057094 A1 * | 3/2013 | Sugimoto | H02K 7/088 | 310/90 |
| 2013/0241329 A1 * | 9/2013 | Yagi | F16C 35/077 | 310/63 |
| 2015/0340922 A1 * | 11/2015 | Kamiya | H02K 5/1732 | 310/58 |
| 2016/0105069 A1 * | 4/2016 | Nakazawa | H02K 5/20 | 310/59 |
| 2018/0320696 A1 * | 11/2018 | Han | F04D 25/06 | |
| 2020/0295628 A1 * | 9/2020 | Reichert | H02K 5/20 | |
| 2020/0395821 A1 * | 12/2020 | Sakurada | H02K 5/203 | |

FOREIGN PATENT DOCUMENTS

| | | |
|---|---|---|
| KR | 10-2014-0011449 A | 1/2014 |
| KR | 10-2016-0014376 A | 2/2016 |
| KR | 10-2017-0071575 A | 6/2017 |
| KR | 10-2018-0018180 A | 2/2018 |
| KR | 10-2018-0035903 A | 4/2018 |

* cited by examiner

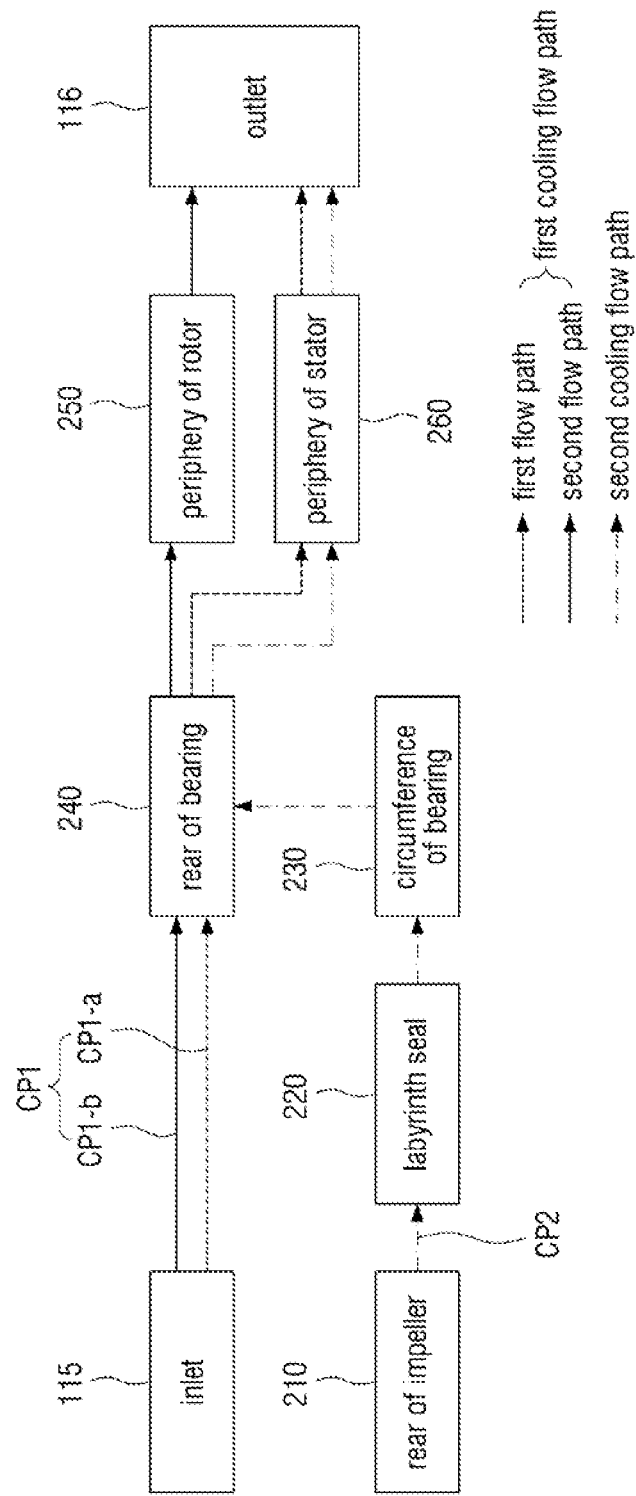

ROTARY DEVICE WITH A FAN MOUNTED OUTSIDE A HOUSING TO INTRODUCE EXTERNAL AIR INTO THE HOUSING

CROSS-REFERENCE TO THE RELATED APPLICATION

This application is based on and claims priority under 35 U.S.C. § 119 to Korean Patent Application No. 10-2019-0066787 filed on Jun. 5, 2019, in the Korean Intellectual Property Office, the disclosure of which is incorporated by reference herein in its entirety.

BACKGROUND

1. Technical Field

Embodiments of the present disclosure relate to a rotary device, for example, to a rotary device capable of cooling heat generated in internal structures when driving a rotor having a permanent magnet.

2. Description of Related Art

In accordance with the demand for the development of high-performance, high-power electrical equipment, rotary devices such as generators and electric motors are provided. Such rotary devices may comprise industrial compressors, pumps, or vehicle air supplies having a rotor-bearing structure. In order to provide driving to such rotary devices, a rotating body having a permanent magnet may be provided to be rotated by a motor. In addition, when the rotary device is driven, the rotary device may be formed with a cooling flow path for cooling friction heat generated from the motor and components related to the rotation of the motor, such as airfoil bearings and bearing discs, by the structure of the rotary device. Specifically, the rotary device may be formed with a cooling device for generating a flow of heat from the inside of the rotary device to the outside in order to discharge the heat generated from the motor or the airfoil bearing, and a cooling flow path may be formed inside a compressor by the cooling device.

For example, the cooling device is a blower fan, and the blower fan may be disposed coaxially with a rotor of the rotary device to a front end or a rear end of the rotary device. For example, in the case where an impeller is disposed in the front end of the rotary device, the blower fan is installed at the rear end of the rotary device in which the impeller is not mounted, or in the case where the impeller is disposed at both ends of the rotary device, the blower fan is disposed to secure a mounting space between the impeller, and generates a flow of the cooling flow path along the same axis of the impeller.

External air of the rotary device is sucked into the blower fan and cooled, and the blower fan forms the same axis as the rotary device, in particular the rotor. Therefore, the efficiency of the blower fan is reduced as well as axial power is lost. Accordingly, it is difficult to apply to a high speed rotor. In addition, when a plurality of blower fans are mounted inward to efficiently cool heat of the high speed rotor, a size of the rotary device is inevitably increased because a separate space for mounting the blower fan must be secured. This counters the demand for miniaturization and lightening of rotary devices. In addition, since air used for cooling is vented to the outside, the efficiency of the rotary device due to the flow rate loss may be reduced.

Therefore, there is a need for a rotary device that enables efficient cooling while applying a high speed rotor to the rotary device.

SUMMARY

Aspects of embodiment of the present disclosure provide a rotary device capable of realizing efficient cooling in a rotary device to which a high speed rotor is applied, and preventing a loss of axial power of the rotary device for driving a blower fan.

However, aspects of embodiments of the present disclosure are not restricted to those set forth herein. The above and other aspects of embodiments of the present disclosure will become more apparent to one of ordinary skill in the art to which embodiments of the present disclosure pertain by referencing the detailed description of embodiments of the present disclosure given below.

According to some embodiments of the present disclosure, a rotary device is provided. The rotary device includes: a housing; an impeller provided in the housing; a rotor disposed at a rear of the impeller, and configured to rotate; a stator disposed to surround the rotor; a bearing at the rear of the impeller, and configured to relieve friction caused by rotation of the rotor while supporting the rotor when the rotor is rotated; and a fan mounted to an outside of the housing, and configured to introduce external air into an inside of the housing and, after the external air is heated while travelling on a cooling flow path, release the external air to the outside of the housing.

According to an embodiment, the housing is provided with an inlet that is configured to introduce the external air into the housing, and the housing is further provided with an outlet that is configured to release the external air, introduced into the inlet, to the outside of the housing from the cooling flow path.

According to an embodiment, the inlet is provided in the housing, and the inlet is configured to introduce the external air in proximity to a position of the bearing such that the external air receives heat generated from the bearing and moves to the cooling flow path.

According to an embodiment, the inlet is disposed on one side of the housing, and the outlet is disposed on another side of the housing.

According to an embodiment, the fan is disposed at the outlet, and the fan is configured to be driven in a direction to emit the external air, in the inside of the housing, in a direction towards the outside of the housing.

According to an embodiment, in a case where the fan that is disposed at the outlet is driven, the external air is introduced into the cooling flow path through the inlet and flows along the cooling flow path, and is released from the outlet through the fan.

According to an embodiment, the fan is disposed at the inlet, and the fan is configured to be driven in a direction in which the external air is introduced into the inside of the housing.

According to an embodiment, in a case where the fan that is disposed at the inlet is driven, the external air is introduced into the inlet through the fan, flows along the cooling flow path, and is released from the outlet.

According to an embodiment, the housing is provided with an additional inlet that is configured to introduce additional external air into the housing, and the inlet is disposed on one side of the housing, the additional inlet is disposed on another side of the housing, and the outlet is disposed in a position between the inlet and the additional inlet.

According to an embodiment, the fan is disposed at the outlet, and the fan is configured to be driven in a direction to emit the external air and the additional external air, in the inside of the housing, in a direction towards the outside of the housing, and in case where the fan that is disposed at the outlet is driven, the external air is introduced into the cooling flow path through the inlet on the one side of the housing, the additional external air is introduced into the cooling flow path through the additional inlet on the another side of the housing, the external air and the additional external air flow along respective inner flow paths of the cooling flow path, and the external air and the additional external air are released from the outlet through the fan.

According to an embodiment, the fan is disposed at the inlet, and the fan is configured to be driven in a direction in which the external air is introduced into the inside of the housing, and in a case where the fan that is disposed at the inlet is driven, the external air is introduced into the inlet through the fan, flows along an inner flow path of the cooling flow path, and is released from the outlet.

According to an embodiment, the cooling flow path, provided in the inside of the housing, comprises a first cooling flow path and a second cooling flow path, the first cooling flow path is provided at a rear of the bearing and a periphery of the stator or the rotor, and configured to receive the external air from an inlet of the housing and provide the external air to an outlet of the housing, and the second cooling flow path is provided at a periphery of the bearing and between the stator and the rotor, and configured to receive compressed air at a rear end of the impeller and provide the compressed air to the outlet.

According to an embodiment, the first cooling flow path comprises: a first flow path through which a first portion of the external air introduced into the inlet flows to the rear of the bearing, the periphery of the stator, and the outlet; and a second flow path through which a second portion of the external air introduced into the inlet flows to the rear of the bearing, the periphery of the rotor, and the outlet.

According to an embodiment, the second flow path, of the first cooling flow path, and the second cooling flow path share a same path at the rear of the bearing, the periphery of the rotor, and the outlet.

According to an embodiment, a coating layer is formed on an outer circumference of the rotor adjacent to the bearing, such as to provide lubrication between the rotor and the bearing.

According to an embodiment, heat dissipation fins between the housing and the stator, the heat dissipation fins configured to dissipate heat that is in the inside of the housing.

According to some embodiments of the present disclosure, a rotary device for a rotating body is provided. The rotary device includes a housing provided with an inlet and an outlet that are configured to receive and emit external air to and from the housing, respectively; and a fan positioned at the inlet or the outlet and configured to introduce the external air into the inlet.

According to an embodiment, the fan is disposed at the outlet, and the fan is configured to be driven in a direction to emit the external air, in an inside of the housing, to an outside of the housing.

According to an embodiment, the fan is disposed at the inlet, and the fan is configured to be driven in a direction to introduce the external air into the inside of the housing.

According to some embodiments of the present disclosure, a method operating a rotary device that includes a housing provided with an inlet and an outlet that are configured to receive and emit external air to and from the housing, respectively, and a fan positioned at the inlet or the outlet and configured to introduce the external air into the inlet. The method includes: driving, in a case where the fan is disposed at the outlet, the fan in a direction to emit the external air, in an inside of the housing, to an outside of the housing, or driving, in a case where the fan is disposed at the inlet, the fan in a direction to introduce the external air into the inside of the housing.

Other specific details of embodiments of the present disclosure are included in the detailed description and drawings.

According to a rotary device according to embodiments of the present disclosure, a blower fan that sucks air into an inside of the rotary device having a high speed rotor is implemented outside a housing of the rotary device. Therefore, the blower fan does not use axial power of the rotary device so that it may possible to prevent the loss of the axial power.

In addition, by installing the blower fan on the outside of the housing in the rotary device, the internal structure of the rotary device may be simplified, and the rotary device itself may be downsized and light weight.

Further, by forming a coating layer on a rotor side outer circumference of a portion where the bearing and the rotor contact, it is possible to limit the provision of the coating layer on a surface of the bearing. As a result, the bearing manufacturability is improved, as well as the uniform shape of the bearing may be manufactured, thereby ensuring the reliability of the bearing. In addition, as the coating layer is formed on the rotor, the wear of the coating layer may occur uniformly as compared to the configuration in which the coating layer is formed on the bearing. If the coating layer formed on the rotor is worn out, it may be recovered by recoating.

However, aspects of embodiments of the present disclosure are not restricted to those set forth herein. The above and other aspects of embodiments of the present disclosure will become more apparent to one of ordinary skill in the art to which embodiments of the present disclosure pertain by referencing the detailed description of embodiments of the present disclosure given below.

BRIEF DESCRIPTION OF THE DRAWINGS

The above and other aspects and features of the embodiments of the present disclosure will become more apparent by describing in detail non-limiting example embodiments thereof with reference to the attached drawings, in which:

FIG. 10 is a block diagram schematically illustrating a cooling flow path in a rotary device according to an embodiment of the present disclosure.

DETAILED DESCRIPTION

Embodiments of the present disclosure may have various modifications and include various embodiments. Therefore, some embodiments will be described in detail with reference to the drawings. However, this is not intended to limit the present disclosure to the specific embodiments described in detail. It is to be understood that all changes, equivalents, and substitutes included in the spirit and scope of the present disclosure are included.

The terminology used herein is for the purpose of describing particular example embodiments only and is not intended to be limiting of the present disclosure. Singular expressions include plural expressions unless the context clearly dictates otherwise. Herein, the terms such as "comprise" or "have" are intended to specify the presence of stated features, integers, steps, operations, components, parts, or combinations thereof. It should be understood that they do not preclude the possibility of presence or addition of one or more other features, numbers, steps, operations, components, parts, or combinations thereof.

Unless otherwise defined, all terms used herein, including technical or scientific terms, have the same meaning as commonly understood by one of ordinary skill in the art to which embodiments of the present disclosure belong. The terms such as those defined in commonly used dictionaries are to be interpreted as having a meaning consistent with the meaning of the context in the relevant art. Unless explicitly defined herein, they are not interpreted as an ideal or overly formal meaning.

Hereinafter, the configuration of non-limiting example embodiments of the present disclosure will be described in detail with reference to the accompanying drawings.

Figure 1:
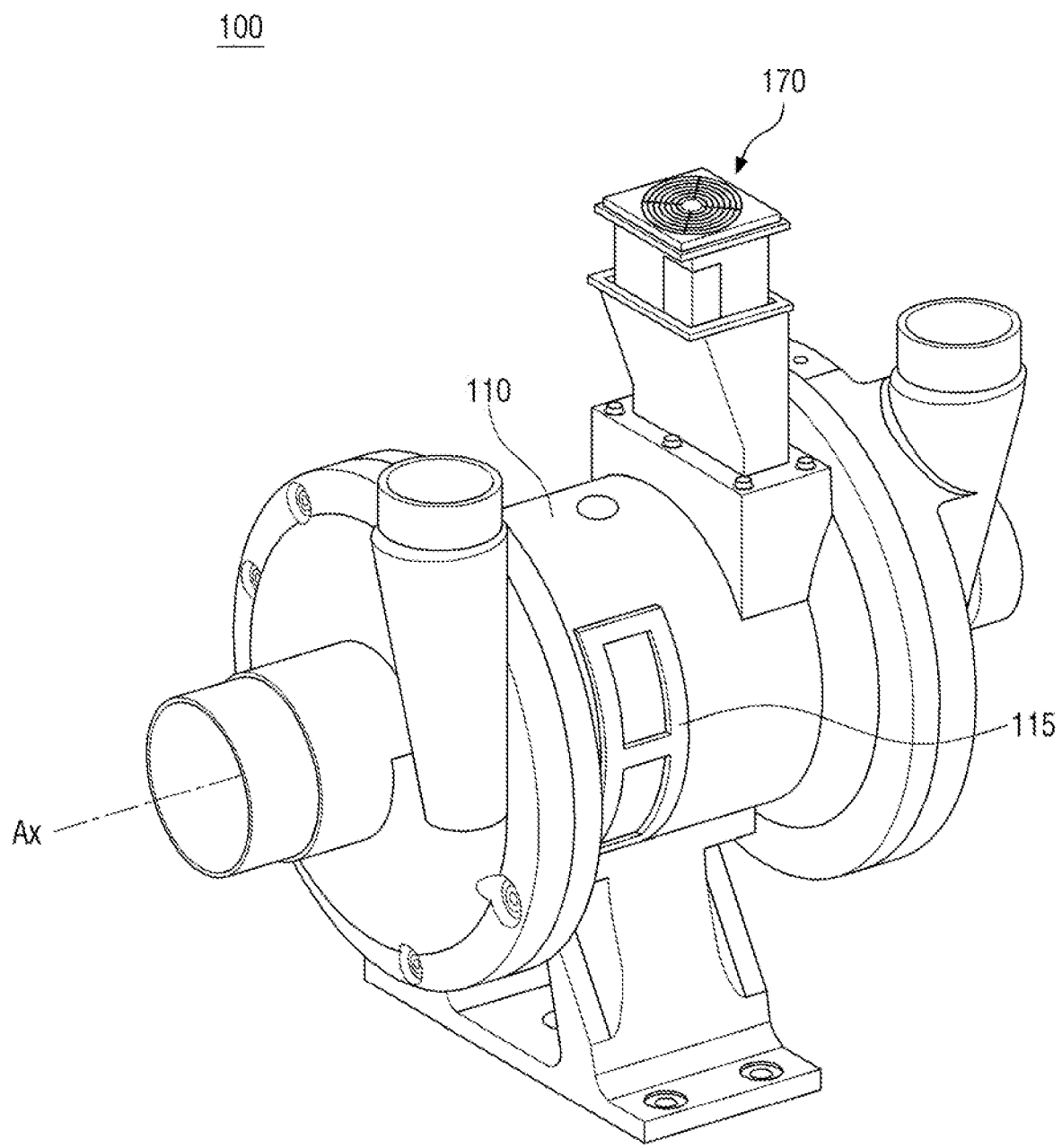
FIG. 1 is a schematic perspective view of the rotary device according to an embodiment of the present disclosure.
Figure 2:
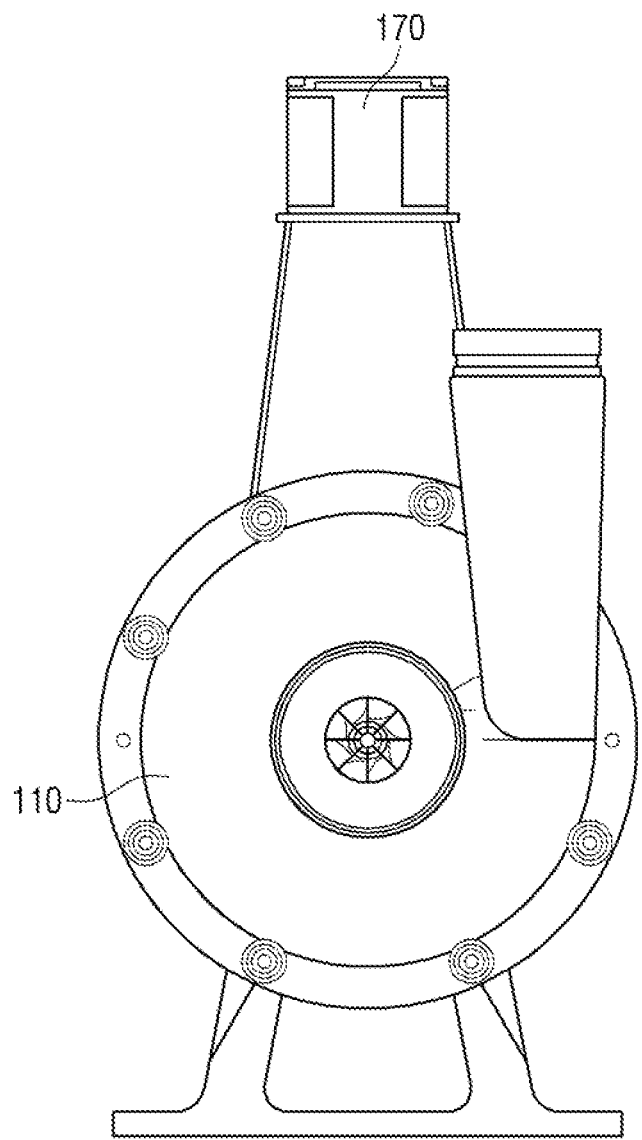
FIG. 2 is a schematic side view of the rotary device according to an embodiment of the present disclosure.
Figure 3:
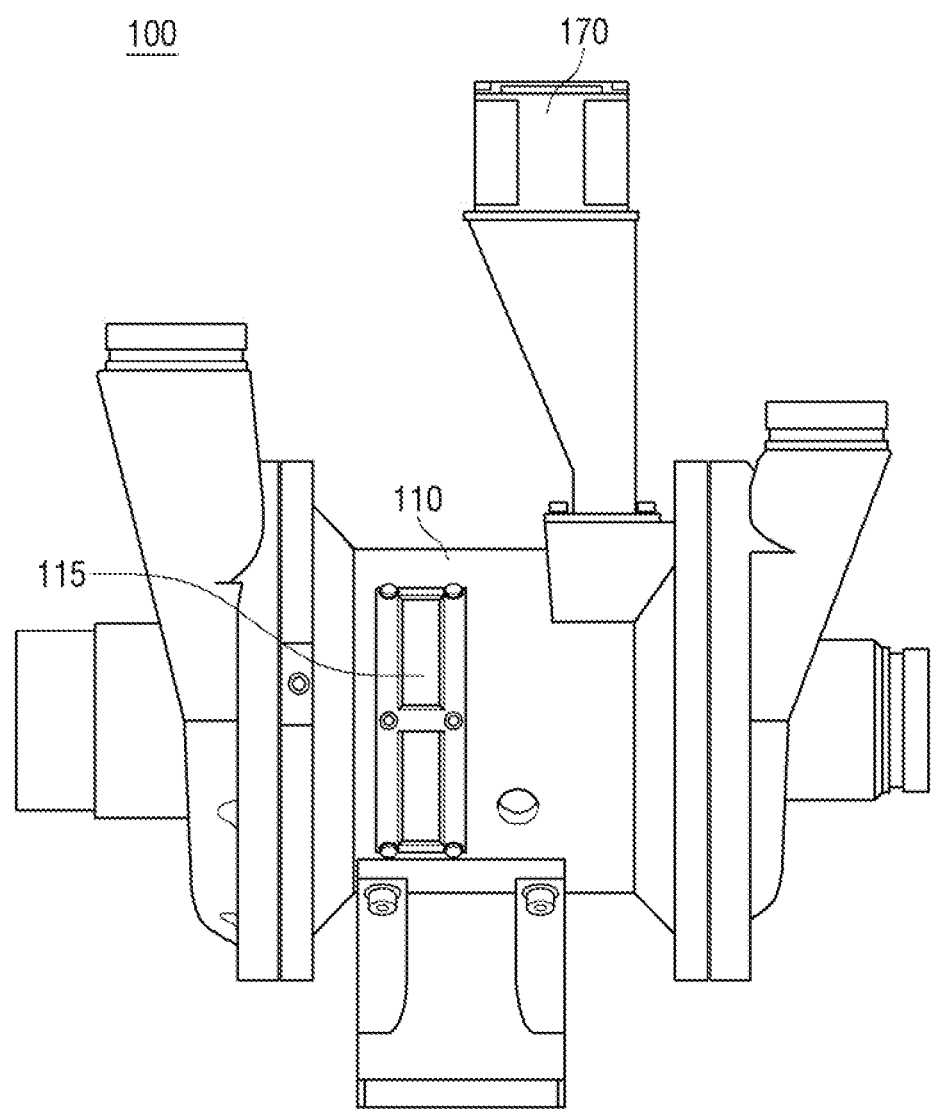
FIG. 3 is a schematic front view of the rotary device according to an embodiment of the present disclosure.
Figure 4:
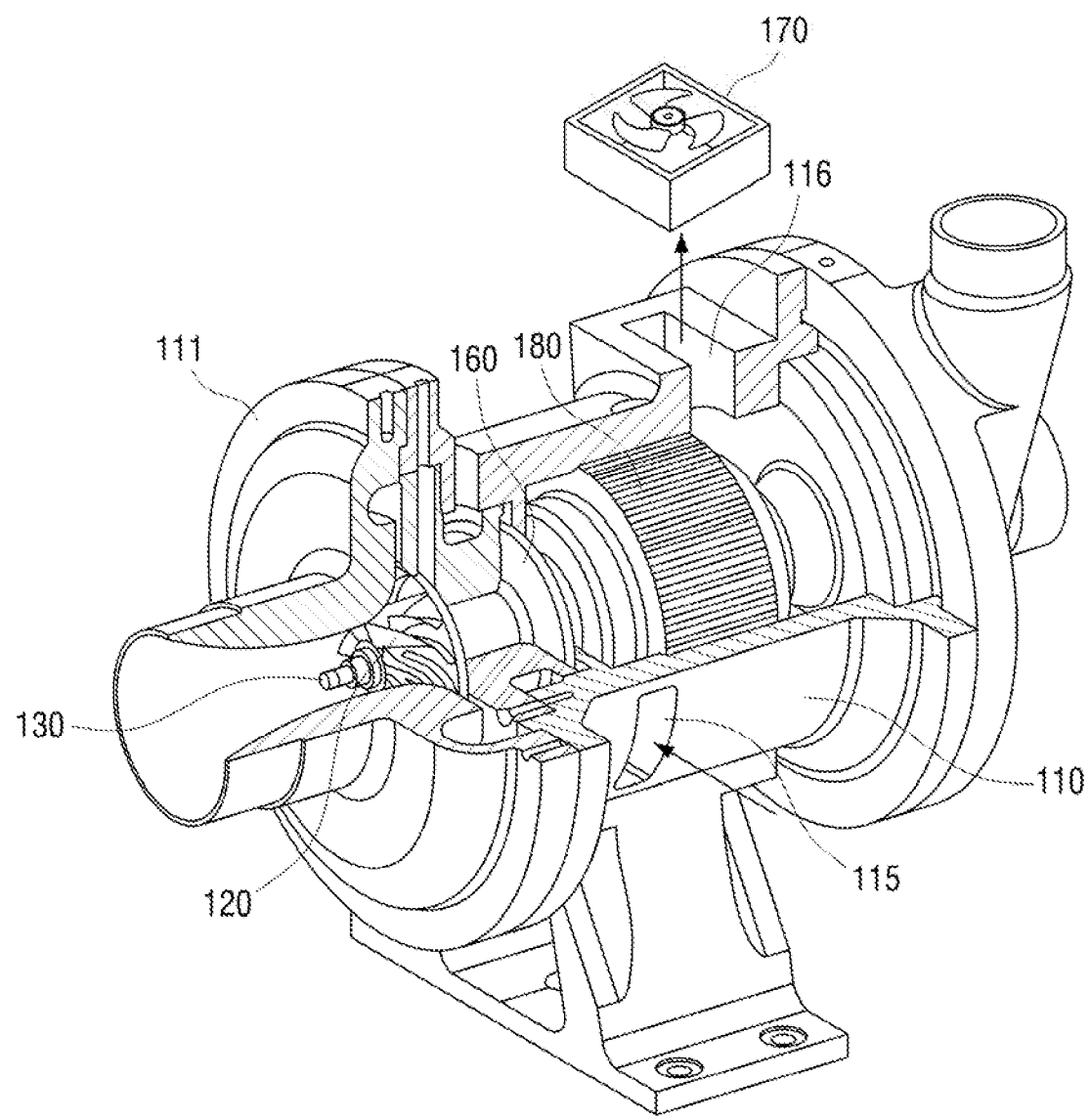
FIG. 4 is a schematic cross-sectional view of the rotary device having an impeller only on one side in the rotary device according to an embodiment of the present disclosure.
Figure 5:
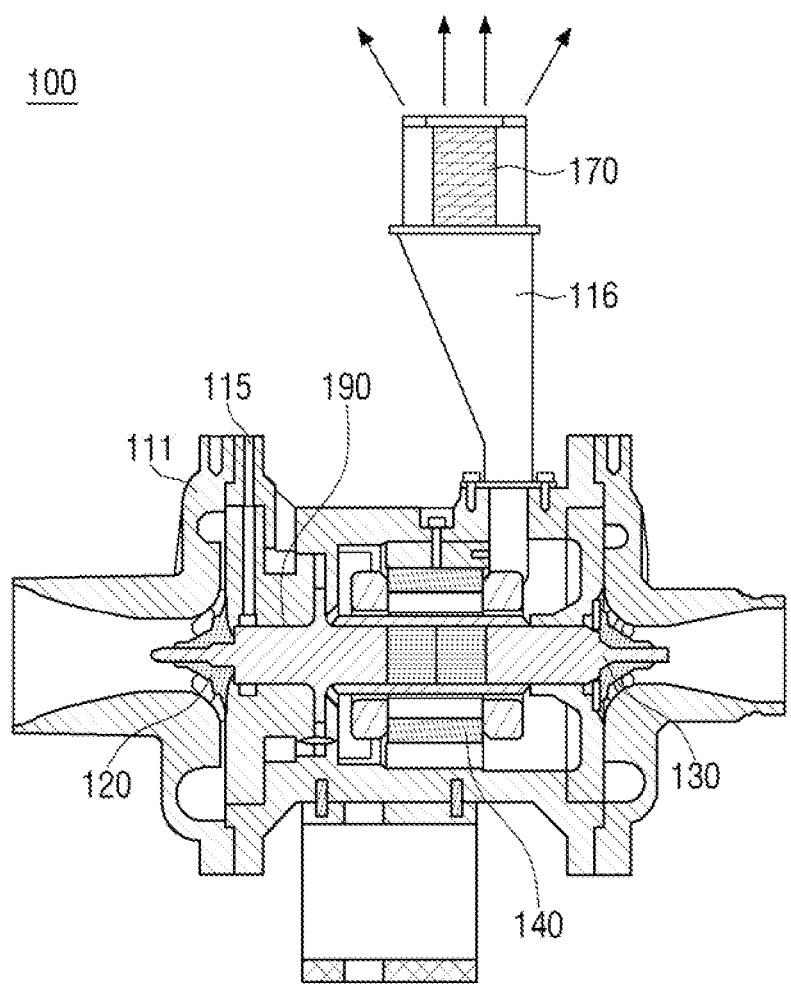
FIG. 5 is a schematic internal cross-sectional view of the rotary device according to an embodiment of the present disclosure.

FIG. 1 is a schematic perspective view of a rotary device 100 according to an embodiment of the present disclosure. FIG. 2 is a schematic side view of the rotary device 100 according to the embodiment of the present disclosure. FIG. 3 is a schematic front view of the rotary device 100 according to the embodiment of the present disclosure. FIG. 4 is a schematic cross-sectional view of the rotary device 100 having an impeller 120 only on one side in the rotary device 100 according to the embodiment of the present disclosure. FIG. 5 is a schematic internal cross-sectional view of the rotary device 100 according to the embodiment of the present disclosure.

Figure 6:
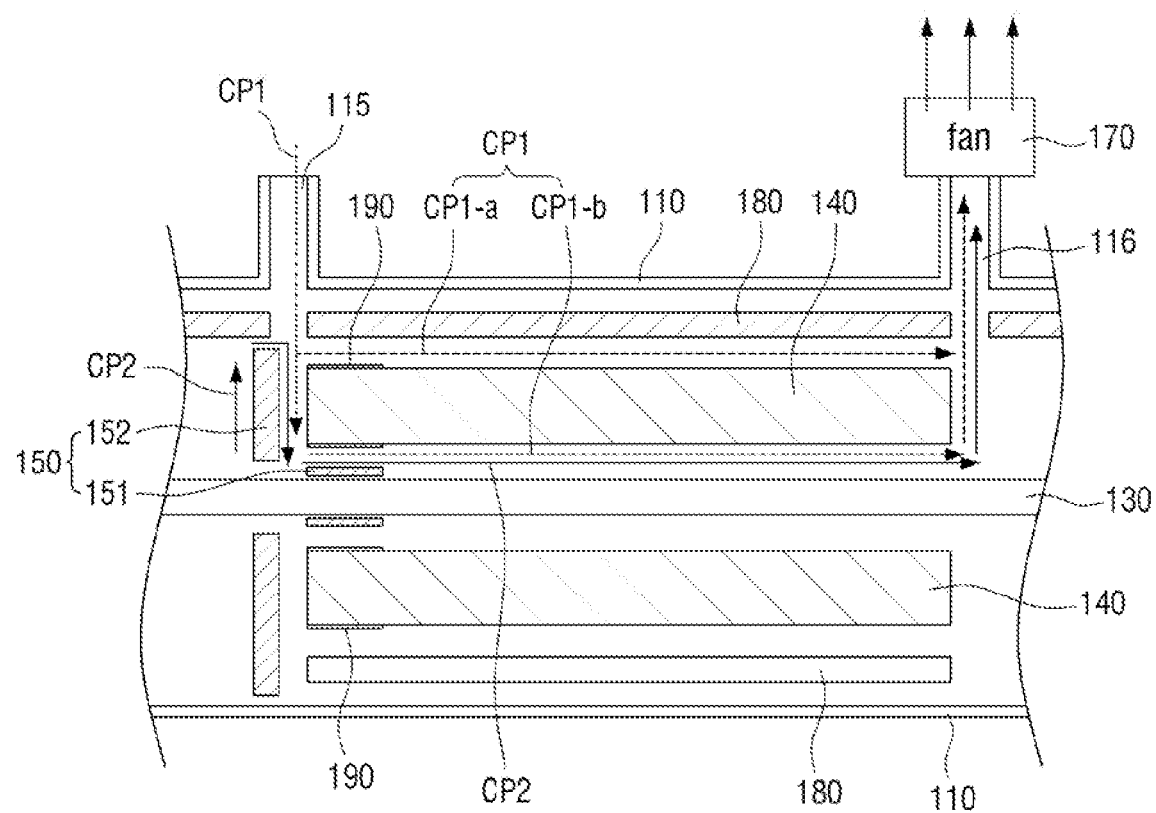
FIG. 6 is a view schematically illustrating a structure in which a cooling member is provided at an outlet in a rotary device according to an embodiment of the present disclosure.

Referring to FIGS. 1 to 5, the rotary device 100 according to the embodiment of the present disclosure may include a housing 110, an impeller 120, a rotor 130, a stator 140, a bearing 150 (e.g., a first bearing 151 and a second bearing 152) (see, e.g., FIG. 6). In addition, the rotary device 100 may further include a support disk 160, a labyrinth seal 161 (see, e.g., FIG. 9), a spiral case 111, a heat dissipation fin, and the like.

The housing 110 may form a space for accommodating the rotor 130 and the stator 140, which will be described later. Specifically, the rotor 130 may be mounted to penetrate an axial direction of the housing 110 so that the rotor 130 may be rotatably accommodated. The stator 140 may be accommodated in an inside of the housing 110 in a peripheral space of the rotor 130. Although not shown, a cooling fluid accommodating space (also referred to as a 'cooling chamber') may be further formed to accommodate a cooling fluid capable of dissipating heat generated by the rotor 130 to a separate space adjacent to the accommodating space.

The spiral case 111 (also referred to as a 'scroll') may be fastened to one end of the housing 110. The spiral case 111 may be coupled to one surface of the housing 110, and may be provided to provide a movement path of the cooling fluid. Although not specifically illustrated, the spiral case 111 may include an inlet (e.g., inlet 115) for introducing gas, an outlet (e.g. outlet 116) for discharging, and a transfer pipe for a movement path. The housing 110 and the spiral case 111 may be formed in a symmetrical shape with respect to an axis.

The housing 110 may be provided with the inlet 115 and the outlet 116 connected to the outside and through which external air may be introduced into an inside of the housing 110 or air flowing in the inside of the housing 110 may be discharged to the outside, respectively. The inlet 115 and the outlet 116 may be described in detail with the description of a cooling member 170.

The impeller 120 may be provided in the housing 110. For example, the impeller 120 may be provided on a front of the housing 110, or two of the impeller 120 may be provided at both ends of the housing 110. The impeller 120 may be rotatably provided at a high speed about an axis for compression action of the working fluid. For example, the impeller 120 may perform a function of pressurizing gas while rotating by receiving a rotational force from the rotor 130 to be described later. The impeller 120 may be coupled to the coupling rod, which will be described later, to be connected to the rotor 130, and may be provided to receive the rotational force of the rotor 130. The impeller 120 may be rotatably fixed to the coupling rod by a fastening member (e.g. a fastener).

The rotor 130 is mounted in an inner space of the housing 110. For example, the rotor 130 may be mounted in the inner space of the housing 110 in an axial direction from one end to the other end of the housing 110, and may be provided to be rotated around the axial direction. The rotor 130 may include a coupling rod that makes up a frame, a permanent magnet disposed on the coupling rod and assembled inside of the housing 110, and a sleeve member surrounding the permanent magnet. The coupling rod may be formed in the axial direction. The rotor 130 may be coupled to the impeller 120 through the coupling rod formed in the axial direction, and may transmit rotational power generated inside of the housing 110 to the impeller 120. The permanent magnet generates a predetermined rotational force from electrical energy input through electromagnetic interaction with the stator 140 provided in the housing 110 as described later. The sleeve member may be provided to surround an outer circumference of the permanent magnet at a predetermined pressure. The sleeve member functions to restrain the permanent magnet from being separated from the coupling rod by a centrifugal force due to the high speed rotation.

The coupling rod may perform a function of coupling the rotor 130 and the impeller 120. The second bearing 152 of the bearing 150 described later may be rotatably coupled to the coupling rod. A thread may be formed at an end of the coupling rod. A fastening member such as a nut for coupling the impeller 120 to the coupling rod may be coupled to the end of the coupling rod, in which the fastening member may be coupled to the end of the coupling rod through the thread.

A bearing 150, which will be described later, is disposed adjacent to a periphery of one end and a periphery of the other end of the rotor 130, in which when the rotary device 100 starts up, friction between the rotor 130 and the bearing 150 may occur. The heat generated between the rotor 130 and the bearing 150 is dissipated through the cooling member 170, which will be described later. However, in order to minimize frictional heat with the bearing 150 at the start of the rotor 130, a coating layer 180 and/or a coating layer 190, specifically, a solid lubricated coating layer may be formed on an outer circumference of the rotor 130 adjacent to the bearing 150. As the coating layer 180 and/or the coating layer 190 is formed on the rotor 130, it is possible to limit the occurrence of coating problems such as rolling or dropping, which may occur during the manufacturing of a bearing, specifically, the bearing 150 which may be an air foil bearing. In addition, the manufacturing ability of the bearing 150 is improved, and the production of a uniform shape is facilitated. Therefore, even the reliability may be secured. In addition, as the coating layer 180 is provided on the rotor 130, wear of the coating layer 180 may also occur uniformly. Moreover, when the coating layer 180 coated on the outer circumference of the rotor 130 is excessively worn, it is possible to recover it through recoating.

As the stator 140 forms a magnetic force that changes depending on a driving current input to the stator 140, the rotor 130 may be rotated to correspond to the permanent magnet assembled inside of the rotor 130. The rotor 130 is rotated at a high speed of about 30,000 rpm or more by the permanent magnet and the stator 140. The high speed rotation of the rotor 130 may be supported by a front radial bearing and a rear radial bearing (e.g., respective ones of first bearing 151) installed at both ends of the housing 110, respectively for receiving the rotor 130, and the second bearing 152 (corresponding to "a thrust bearing") installed adjacent one end of housing 110.

Although not shown, the stator 140 may include a winding and a core. A driving current may be input to the stator 140 as an operation signal to the stator 140, and the stator 140 may electromagnetically interact with the rotor 130, specifically the permanent magnet. As a result, the coupling rod is rotated, and the impeller 120 coaxially connected thereto may be driven at a predetermined rotational speed depending on an input current.

The bearing 150 may perform a function of alleviating friction between the rotor 130 and the housing 110, and may perform a function of supporting the rotor 130 when the rotor 130 is rotated. The bearing 150 may include the first bearing 151 and the second bearing 152. The first bearing 151 may be disposed in a direction of a rotation axis of the rotor 130.

The first bearing 151 is a radial bearing, and may include an airfoil bearing. The first bearing 151 may be provided to support a radial load of the rotor 130 while maintaining a predetermined bearing gap between the first bearing 151 and the rotor 130. The first bearing 151 may be installed at the front and rear, respectively, in a space for accommodating the rotor 130. For example, one first bearing 151 may be a front radial bearing and may be provided in a front space of the housing 110, and another first bearing 151 may be a rear radial bearing 151*b* and may be provided in a rear space of the housing 110.

The second bearing 152 is a thrust bearing, and may include an airfoil bearing. The second bearing 152 may be disposed in a direction perpendicular to the rotation axis of the rotor 130. The second bearing 152 may be provided to absorb an axial load of the impeller 120. In addition, the second bearing 152 may be formed to have a sufficient area so that the second bearing 152 is provided with a fluid pressure capable of countering the axial load.

In an example of the embodiment, the first bearing 151 and the second bearing 152 include an airfoil bearing, but it is not limited thereto. For example, the first bearing 151 may be changed or deformed as long as it may support the radial load of the rotor 130 while having an appropriate size to suppress the vibration of the rotor 130.

The support disk 160 may be fixedly coupled to the housing 110 to support one end of the rotor 130. In other words, the rotor 130 may be supported by the support disk 160 to be rotated with respect to the housing 110. A sealing member may be further included in a portion of the support disk 160 that is coupled to the rotor 130 as a central portion of the support disk 160. The sealing member may perform a function of restricting inflow of a gas pressurized by the impeller 120 into an interior of the housing 110, for example, a space, between the rotor 130 and the impeller 120. The sealing member may include a labyrinth seal 161 (see, e.g., FIG. 9) and a shield ring. The labyrinth seal 161 may be attached to one surface of the support disk 160, and the rotor 130 may be supported by the support disk 160 through the labyrinth seal 161.

One or more heat dissipation fins may be further provided in an inner surface of the housing 110, specifically, between the inner surface of the housing 110 and the stator 140 to dissipate heat generated inside of the housing 110.

Figure 7:
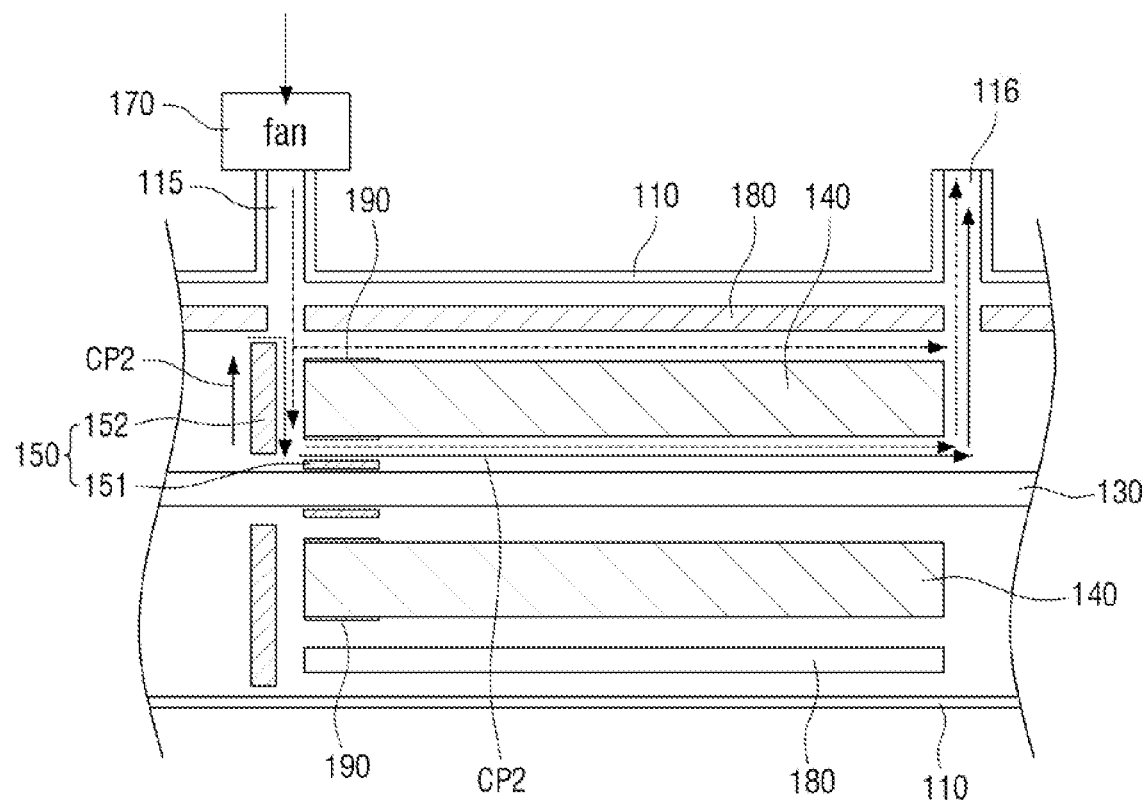
FIG. 7 is a view schematically illustrating a structure in which a cooling member is provided at an inlet in a rotary device according to an embodiment of the present disclosure.
Figure 8:
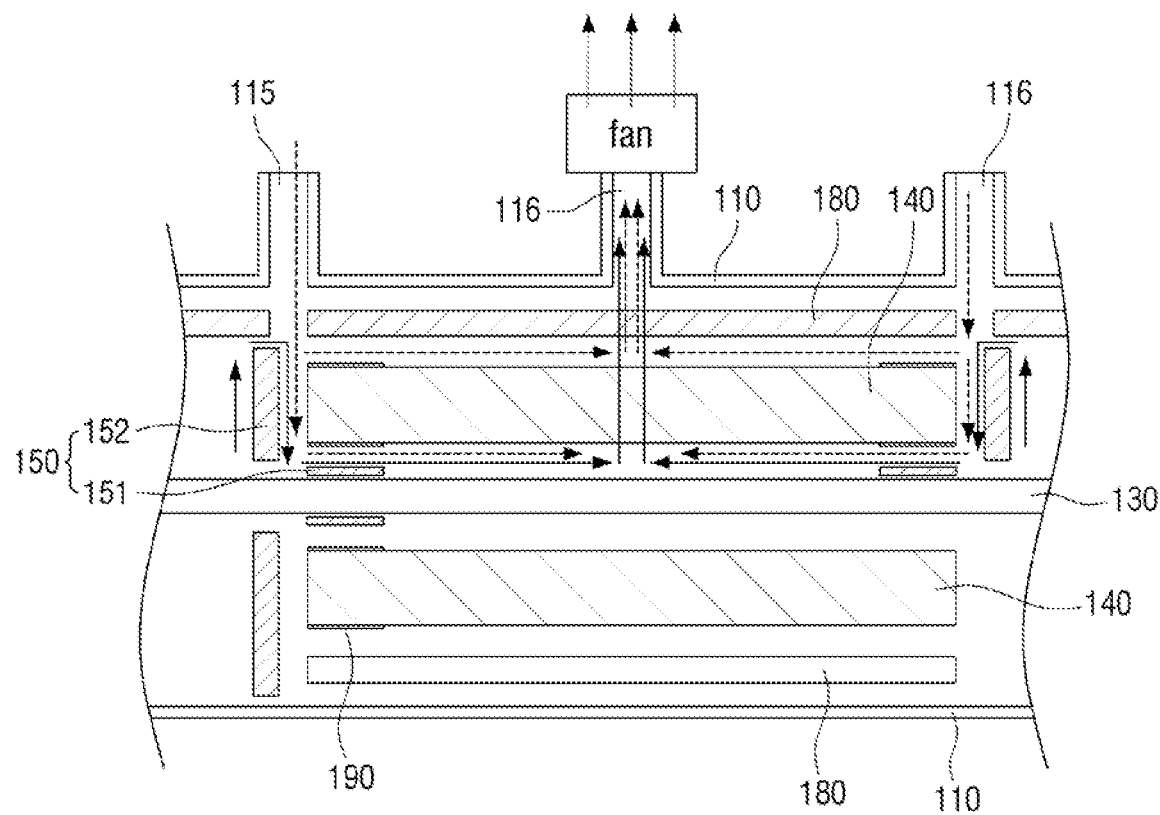
FIG. 8 is a view schematically illustrating a structure in which inlets are formed at both sides of a housing and an outlet is formed at a central portion of the housing in the rotary device according to an embodiment of the present disclosure.

FIG. 6 is a view schematically illustrating a structure in which the cooling member 170 is provided at the outlet 116 in the rotary device 100 according to the embodiment of the present disclosure. FIG. 7 is a view schematically illustrating a structure in which the cooling member 170 is provided at the inlet 115 in the rotary device 100 according to the embodiment of the present disclosure. FIG. 8 is a view schematically illustrating a structure in which the inlets 115 are formed at both sides of the housing 110 and the outlet 116 is formed at the central portion of the housing 110 in the rotary device 100 according to the embodiment of the present disclosure.

Referring to FIGS. 6 to 8, the cooling member 170 may be provided to be mounted to the outside of the housing 110, to introduce external air into the inside of the housing 110, to move the air along cooling flow paths CP1 and CP2 inside of the housing 110 to receive heat, and then to emit the air to the outside of the housing 110 to dissipate heat from the housing 110.

In addition, as described above, the inlet 115, the outlet 116, and the cooling flow paths CP1 and CP2 may be formed in the housing 110 to introduce the external air from the outside of the rotary device 100 according to the driving of the cooling member 170, to receive heat of the inside of the housing 110, and then to emit the air again to the outside, respectively.

The inlet 115 is provided in the housing 110 to introduce the external air in the inside of the housing 110 as the cooling member 170 is driven. For example, the inlet 115 may be provided in proximity to a mounting position of the bearing 150. With the inlet 115 positioned in proximity to the mounting position of the bearing 150, the external air flows in, and receives heat from the bearing 150 which becomes a relatively high temperature in the inside of the housing 110. Therefore, the heat of the bearing 150 may be moved to the cooling flow paths CP1 and CP2 while the heat is dissipated. The outlet 116 may be provided to emit the external air introduced from the inlet 115 and the cooling air introduced into the cooling flow paths CP1 and CP2 from a rear of the impeller 120.

In the embodiment of the present disclosure, when the impeller 120 and the bearing 150 are positioned on one side of the rotary device 100, the inlet 115 may be formed at one side of the housing 110. Accordingly, the outlet 116 may be provided on the other side of the housing 110. In addition, when the impeller 120 and the bearing 150 are positioned at both sides of the rotary device 100, the inlet 115 may be formed at both sides of the housing 110. Accordingly, the outlet 116 may be provided at a predetermined position between both ends of the housing 110, for example, at a central portion of the housing 110.

The cooling member 170 may be disposed the outside of the housing 110, in which depending on a driving direction, in one embodiment, the cooling member 170 may be positioned at the outlet 116, and alternatively, in another embodiment, the cooling member 170 may be positioned at the inlet 115. Based on the cooling member 170 being provided at the outlet 116 or the inlet 115, the driving direction may be changed. However, the cooling member 170 may be provided such that the external air is introduced into the housing 110, air introduced into the housing 110 is moved through the cooling flow paths CP1 and CP2, and the air is discharged through the outlet 116. In the embodiment of the present disclosure, the cooling member 170 may be or include a blower fan.

As mentioned above, a driving direction of the blower fan may vary depending on mounting position of the cooling member 170, specifically the blower fan. For example, the cooling member 170 may be disposed at the outlet 116. In this case, the cooling member 170, that is, the blower fan may be driven in a direction to discharge the external air of the cooling flow paths CP1 and CP2 from the inside of the housing 110 to the outside of the housing 110. Therefore, when the blower fan is driven, the external air of the cooling flow paths CP1 and CP2 may flow toward the discharge port and be released through the blower fan of the outlet 116. In addition, the external air may be introduced into the cooling flow paths CP1 and CP2 through the inlet 115. The external air of the cooling flow paths CP1 and CP2 may be released from the discharge port, and the external air may continue to be introduced into the inlet 115, by driving the blower fan.

In addition, the cooling member 170 may be disposed at the inlet 115. In this case, the cooling member 170, that is, the blower fan may be driven in a direction in which the external air is introduced from the outside of the housing 110 into the inside of the housing 110, that is, into the cooling flow paths CP1 and CP2. Therefore, when the blower fan is driven, air outside of the cooling flow paths CP1 and CP2 may continue to be introduced into the inlet 115 through the blower fan as the blower fan is driven. As the cooling member 170 is driven, the external air may be introduced into the inlet 115 and be introduced into the cooling flow paths CP1 and CP2, and may be released through the outlet 116.

As described above, since the inlet 115 is provided at one side of the housing 110, that is, a position adjacent to the bearing 150, and the outlet 116 is disposed on the other side of the housing 110, the external air introduced into the inlet 115 may be moved from one side of the rotor 130 to the other side thereof while receiving heat from the bearing 150 and dissipating the heat. The external air may receive heat from the rotor 130 and be released through discharge holes of the outlet 116 while moving from one side of the rotor 130 to the other side thereof.

Alternatively, when the inlet 115 is provided on both sides of the housing 110, that is, adjacent to each of the bearings 150 disposed on both sides of the housing 110, and when the outlet 116 is provided on a central portion side of the housing 110 between the inlets 115, the external air may be introduced from the inlets 115 at both sides of the housing 110, and may be moved along a direction from one side of the rotor 130 to the other side thereof and a direction from the other side of the rotor 130 to the one side thereof while receiving heat from each of the bearings 150 and dissipating the heat. The external air may receive heat from the rotor 130 and be released through the outlet 116 while moving from one side of the rotor 130 to the central portion and from the other side of the rotor 130 to the central portion.

Figure 9:
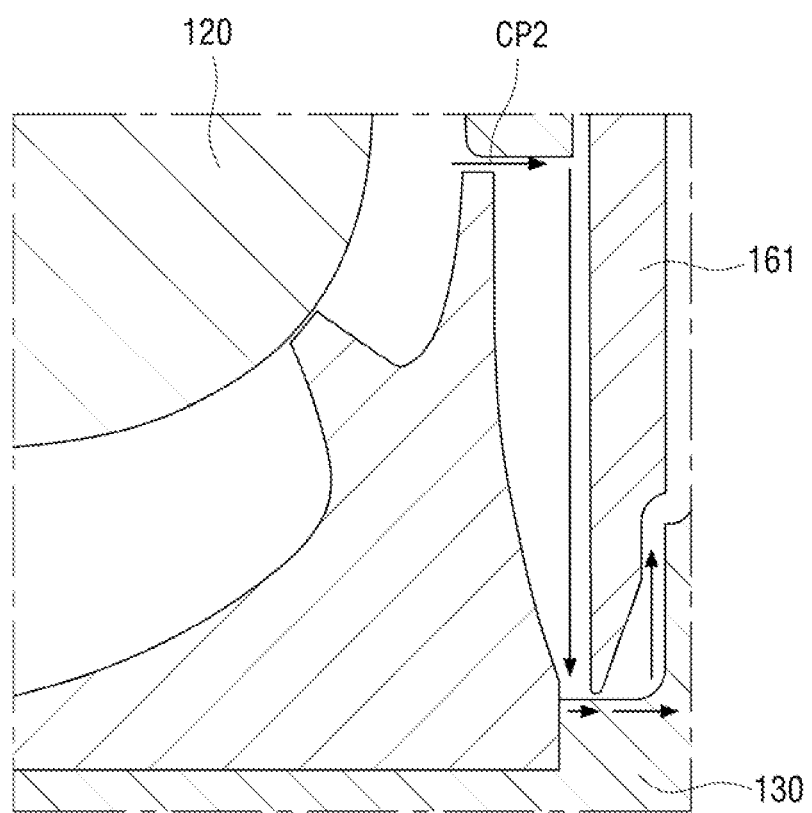
FIG. 9 is a partially enlarged view for explaining a cooling structure in a rotary device according to an embodiment of the present disclosure.

As described above, according to the driving of the cooling member 170 disposed on the inlet 115 or the outlet 116, the external air is drawn into the inlet 115 side, and the external air introduced into the inlet 115 flows at the rear of the bearing 150 or adjacent to the rear of the bearing 150. By doing so, heat generated by the driving of the bearing 150 and the rotor 130 may be cooled and moved to the cooling flow paths CP1 and CP2. The external air drawn into the cooling flow paths CP1 and CP2 may receive heat generated from the rotor 130 and the stator 140 to cool the rotor 130 and the stator 140, and may be discharged through the outlet 116 of the other side of the housing 110 or the central portion of the housing 110. FIG. 9 is a partially enlarged view for explaining a cooling structure in the rotary device 100 according to an embodiment of the present disclosure.

Referring to FIG. 9, it may be provided such that some of the external air (hereinafter referred to as 'cooling fluid') drawn into through the rear of the impeller 120 is introduced through a gap of the bearing 150 (in this embodiment, it is a second bearing and corresponds to a thrust bearing), the cooling fluid cools the heat generated in the bearing 150 while flowing around the bearing 150, and it flows along a periphery of the rotor 130 and is discharged to the outlet 116.

Therefore, generally, a heat dissipation structure of the cooling member 170 may be provided, and a heat dissipation structure that enables some of the cooling fluid to be drawn through the rear of the impeller 120 may be provided in an inside of the rotary device 100 according to embodiments of the present disclosure.

FIG. 10 is a block diagram schematically illustrating a cooling flow path in the rotary device according to an embodiment of the present disclosure.

Referring to FIG. 10, the cooling flow paths CP1 and CP2 for dissipating heat in the inside of the housing 110 may be formed in the rotor 130 according to embodiments. The cooling flow paths CP1 and CP2 according to the embodiments of the present disclosure may include a first cooling flow path CP1 forming a flow path that cools by external air through the cooling member 170 as described above, and a second cooling flow path CP2 forming a flow path that cools through the rear of the impeller 120 (210).

As described above, the first cooling flow path CP1 may include a first flow path CP1-$a$ for cooling a periphery of the rotor 130 and a second flow path CP1-$b$ for cooling a periphery of the stator. In addition, the first cooling flow path CP1 and the second cooling flow path CP2 are flow paths in which the external air introduced through the inlet 115 flows inside the rotary device 100 until it is emitted to the outlet 116 according to the driving of the blower fan.

The first flow path CP1-*a* may be connected to the inlet 115, the rear of the bearing 150 (240), the periphery of the stator 140 (260), and the outlet 116. Accordingly, the first flow path CP1-*a* may form a path through which the external air flows and is received and releases internal heat of the housing 110.

The second flow path CP1-*b* may be connected to the inlet 115, the rear of the bearing 150 (240), the periphery of the rotor 130 (250), and the outlet 116. Accordingly, the second flow path CP1-*b* may form a path through which the external air flows and is received and releases internal heat of the housing 110.

Specifically, the external air may be introduced into the inlet 115 by the driving of the cooling member 170 disposed at the inlet 115 or the outlet 116. When the external air is drawn into the inlet 115, the external air flows to the rear of the bearing 150 (240), in which the external air may be separated to flow from the rear of the bearing 150 (240) to the periphery of the stator 140 (260) and the rotor 130 (250). Accordingly, as the external air flows to the periphery of the stator 140 (260), the external air may flow along the first flow path CP1-*a* to implement cooling. Further, as the external air flows to the periphery of the rotor 130 (250), the external air may flow along the second flow path CP1-*b* to implement cooling.

Here, the second flow path CP1-*b* and the second cooling flow path CP2 may be provided to share some cooling flow paths CP1 and CP2. Specifically, the second cooling flow path CP2 may form a flow path connected to the labyrinth seal 161 (220), the periphery of the bearing 150 (230, 240), the periphery of the rotor 130 (250) and/or the periphery of the stator 140 (260), and the outlet 116, through the rear of the impeller 120 (210). The second flow path CP1-*b* may form a flow path connected to the rear of the bearing 150 (240), the periphery of the rotor 130 (250), and the discharge hole of the outlet 116, through the inlet 115. As described above, the second cooling flow path CP2 and the second flow path CP1-*b* may be provided to share some cooling flow paths CP1 and CP2 connected to the rear of the bearing 150 (240), the periphery of the rotor 130 (250), and the outlet 116.

In the above detailed description, specific non-limiting example embodiments have been described. However, it will be apparent to those skilled in the art that various modifications may be made without departing from the scope of the present disclosure.

What is claimed is:

1. A rotary device, comprising:
   a housing;
   an impeller provided in the housing;
   a rotor disposed at a rear of the impeller in an axial direction of the rotary device, and configured to rotate;
   a stator disposed to surround the rotor;
   a bearing at the rear of the impeller, and configured to relieve friction caused by rotation of the rotor while supporting the rotor when the rotor is rotated; and
   a fan mounted to an outside of the housing in a first direction that is perpendicular to the axial direction of the rotary device, and configured to introduce external air into an inside of the housing in a second direction that is opposite to the first direction and, after the external air is heated while travelling on a cooling flow path, release the external air to the outside of the housing in the first direction,
   wherein the housing is provided with an inlet that is configured to introduce the external air into the housing in the second direction that is perpendicular to the axial direction of the rotary device, and the inlet comprises a first opening in a first portion of an outer surface of the housing, the first opening and the first portion of the outer surface facing in the first direction that is perpendicular to the axial direction,
   wherein the housing is further provided with an outlet that is configured to release the external air, introduced into the inlet, to the outside of the housing in the first direction that is perpendicular to the axial direction of the rotary device from the cooling flow path, and the outlet comprises a second opening in a second portion of the outer surface of the housing, the second opening and the second portion of the outer surface facing in the first direction that is perpendicular to the axial direction,
   wherein the fan is positioned at one of the inlet and the outlet and depending on a driving direction of the fan, the external air is introduced in the housing in the second direction that is perpendicular to the axial direction of the rotary device and the external air which is heated while travelling on the cooling flow path is discharged through the housing in the first direction that is perpendicular to the axial direction of the rotary device, and
   wherein the inlet is provided in the housing, and the inlet is configured to introduce the external air into the housing in the second direction, that is perpendicular to the axial direction, in proximity to a position of the bearing such that the external air receives heat generated from the bearing and moves to the cooling flow path.

2. The rotary device of claim 1, wherein a coating layer is formed on an outer circumference of the rotor adjacent to the bearing, such as to provide lubrication between the rotor and the bearing.

3. The rotary device of claim 1, further comprising:
   heat dissipation fins between the housing and the stator, the heat dissipation fins configured to dissipate heat that is in the inside of the housing.

4. The rotary device of claim 1, wherein
   the housing is provided with an additional inlet that is configured to introduce additional external air into the housing in the second direction that is perpendicular to the axial direction, and
   the inlet, that is configured to introduce the external air into the housing in the second direction that is perpendicular to the axial direction, is disposed on one side of the housing, the additional inlet is disposed on another side of the housing, and the outlet, that is configured to release the external air to the outside of the housing in the first direction that is perpendicular to the axial direction, is disposed in a position between the inlet and the additional inlet.

5. The rotary device of claim 4, wherein
   the fan is disposed at the outlet that is configured to release the external air to the outside of the housing in the first direction that is perpendicular to the axial direction, and the fan is configured to be driven in a direction to emit the external air and the additional external air, in the inside of the housing, in the first direction, that is perpendicular to the axial direction, towards the outside of the housing, and in case where the fan that is disposed at the outlet is driven, the external air is introduced in the second direction, that is perpendicular to the axial direction, into the cooling flow path through the inlet on the one side of the housing, additional external air is introduced in the second direction into the cooling flow path through the additional inlet on the another side of the housing, the external air and the additional external air flow along respective inner flow paths of the cooling flow path, and the external air and the additional external air are released from the outlet through the fan in the first direction that is perpendicular to the axial direction.

6. The rotary device of claim 4, wherein
the fan is disposed at the inlet, and the fan is configured to be driven in a direction in which the external air is introduced into the inside of the housing in the second direction that is perpendicular to the axial direction, and in a case where the fan that is disposed at the inlet is driven, the external air is introduced into the inlet through the fan in the second direction that is perpendicular to the axial direction, flows along an inner flow path of the cooling flow path, and is released from the outlet in the first direction that is perpendicular to the axial direction.

7. The rotary device of claim 1, wherein the inlet that is configured to introduce the external air into the housing in the second direction, that is perpendicular to the axial direction, is disposed on one side of the housing, and the outlet that is configured to release the external air to the outside of the housing in the first direction, that is perpendicular to the axial direction, is disposed on another side of the housing.

8. The rotary device of claim 7, wherein the fan is disposed at the outlet that is configured to release the external air to the outside of the housing in the first direction, that is perpendicular to the axial direction, and the fan is configured to be driven in a direction to emit the external air, in the inside of the housing, in the first direction, that is perpendicular to the axial direction, towards the outside of the housing.

9. The rotary device of claim 8, wherein in a case where the fan that is disposed at the outlet is driven, the external air is introduced in the second direction, that is perpendicular to the axial direction, into the cooling flow path through the inlet and flows along the cooling flow path, and is released from the outlet through the fan in the first direction.

10. The rotary device of claim 7, wherein the fan is disposed at the inlet, that is configured to introduce the external air into the housing in the second direction that is perpendicular to the axial direction, and the fan is configured to be driven in a direction in which the external air is introduced into the inside of the housing in the second direction that is perpendicular to the axial direction.

11. The rotary device of claim 10, wherein in a case where the fan that is disposed at the inlet is driven, the external air is introduced in the second direction, that is perpendicular to the axial direction, into the inlet through the fan, flows along the cooling flow path, and is released from the outlet in the first direction that is perpendicular to the axial direction.

12. The rotary device of claim 1, wherein
the cooling flow path, provided in the inside of the housing, comprises a first cooling flow path and a second cooling flow path,
the first cooling flow path is provided at a rear of the bearing and a periphery of the stator or the rotor, and configured to receive the external air from the inlet, that is configured to introduce the external air into the housing in the second direction that is perpendicular to the axial direction, and provide the external air to the outlet that is configured to release the external air to the outside of the housing in the first direction that is perpendicular to the axial direction, and
the second cooling flow path is provided at a periphery of the bearing and between the stator and the rotor, and configured to receive compressed air at a rear end of the impeller and provide the compressed air to the outlet.

13. The rotary device of claim 12, wherein the first cooling flow path comprises:
a first flow path through which a first portion of the external air introduced into the inlet flows to the rear of the bearing, the periphery of the stator, and the outlet; and
a second flow path through which a second portion of the external air introduced into the inlet flows to the rear of the bearing, the periphery of the rotor, and the outlet.

14. The rotary device of claim 13, wherein the second flow path, of the first cooling flow path, and the second cooling flow path share a same path at the rear of the bearing, the periphery of the rotor, and the outlet.

15. A rotary device for a rotating body, the rotary device comprising:
a housing that comprises an inlet and an outlet that are at a side of the housing in a first direction that is perpendicular to an axial direction of the rotary device, the inlet configured to introduce external air into the housing in a second direction, opposite to the first direction, and the outlet configured to release the external air, introduced into the inlet, to an outside of the housing in the first direction that is perpendicular to the axial direction of the rotary device;
an impeller provided in the housing;
a rotor disposed at a rear of the impeller in the axial direction of the rotary device, and configured to rotate;
a stator disposed to surround the rotor;
a bearing at the rear of the impeller, and configured to relieve friction caused by rotation of the rotor while supporting the rotor when the rotor is rotated; and
a fan positioned outside of the housing in the first direction, at the inlet or the outlet, and configured to introduce the external air into the inlet in the second direction that is perpendicular to the axial direction of the rotary device, and after the external air is heated while travelling on a cooling flow path, release the external air to the outside of the housing in the first direction,
wherein the inlet comprises a first opening in a first portion of an outer surface of the housing, the first opening and the first portion of the outer surface facing in the first direction that is perpendicular to the axial direction,
wherein the outlet comprises a second opening in a second portion of the outer surface of the housing, the second opening and the second portion of the outer surface facing in the first direction that is perpendicular to the axial direction,
wherein the inlet is provided in the housing, and the inlet is configured to introduce the external air into the housing in the second direction, that is perpendicular to the axial direction, in proximity to a position of the bearing such that the external air receives heat generated from the bearing and moves to the cooling flow path.

16. The rotary device of claim 15, wherein the fan is disposed at the outlet that is configured to release the external air to the outside of the housing in the first direction that is perpendicular to the axial direction, and the fan is configured to be driven in a direction to emit the external air, in an inside of the housing, to an outside of the housing in the first direction.

17. The rotary device of claim 15, wherein the fan is disposed at the inlet that is configured to introduce the external air into the housing in the second direction that is perpendicular to the axial direction, and the fan is configured to be driven in a direction to introduce the external air into the inside of the housing in the second direction.

18. A method of operating a rotary device that includes a housing provided with an inlet and an outlet that are configured to receive and emit external air to and from the housing, respectively, and a fan positioned outside of the housing in a first direction that is perpendicular to an axial direction of the rotary device, at the inlet or the outlet, and configured to introduce the external air into the inlet, the method comprising:
  driving, in a case where the fan is disposed at the outlet, the fan in a direction to emit the external air, in an inside of the housing, to an outside of the housing in the first direction that is perpendicular to the axial direction of the rotary device, or
  driving, in a case where the fan is disposed at the inlet, the fan in a direction to introduce the external air into the inside of the housing in a second direction that is opposite to the first direction that is perpendicular to the axial direction of the rotary device,
  wherein the inlet and the outlet are at a side of the housing in the first direction, the inlet configured to introduce the external air into the housing in the second direction, and the outlet configured to release the external air, introduced into the inlet, to the outside of the housing in the first direction,
  wherein the inlet comprises a first opening in a first portion of an outer surface of the housing, the first opening and the first portion of the outer surface facing in the first direction that is perpendicular to the axial direction,
  wherein the outlet comprises a second opening in a second portion of the outer surface of the housing, the second opening and the second portion of the outer surface facing in the first direction that is perpendicular to the axial direction,
  wherein the rotary device further includes:
    an impeller provided in the housing;
    a rotor disposed at a rear of the impeller in the axial direction of the rotary device, and configured to rotate;
    a stator disposed to surround the rotor; and
    a bearing at the rear of the impeller, and configured to relieve friction caused by rotation of the rotor while supporting the rotor when the rotor is rotated,
  wherein the fan is further configured to release the external air to the outside of the housing in the first direction after the external air is heated while travelling on a cooling flow path, and
  wherein the inlet is provided in the housing, and the inlet is configured to introduce the external air into the housing in the second direction, that is perpendicular to the axial direction, in proximity to a position of the bearing such that the external air receives heat generated from the bearing and moves to the cooling flow path.

* * * * *